(12) United States Patent
Curlook

(10) Patent No.: US 6,379,637 B1
(45) Date of Patent: Apr. 30, 2002

(54) DIRECT ATMOSPHERIC LEACHING OF HIGHLY-SERPENTINIZED SAPROLITIC NICKEL LATERITE ORES WITH SULPHURIC ACID

(75) Inventor: Walter Curlook, 25 Cluny Drive, Toronto, Ontario (CA), M4W 2P9

(73) Assignee: Walter Curlook, Toronto (CA)

( * ) Notice: Subject to any disclaimer, the term of this patent is extended or adjusted under 35 U.S.C. 154(b) by 0 days.

(21) Appl. No.: 09/699,452

(22) Filed: Oct. 31, 2000

(51) Int. Cl.$^7$ ............................................... C22B 23/00
(52) U.S. Cl. ............................... 423/150.4; 423/150.1; 423/140; 423/142; 423/146; 423/147
(58) Field of Search .................... 423/150.4, 150.1, 423/142, 147, 146, 140

(56) References Cited

U.S. PATENT DOCUMENTS

| | | | |
|---|---|---|---|
| 3,804,613 | A | 4/1974 | Zundel et al. |
| 4,410,498 | A | 10/1983 | Hatch et al. |
| 4,435,369 | A | * 3/1984 | Simpson |
| 4,541,994 | A | 9/1985 | Lowenhaupt et al. |
| 5,571,308 | A | 11/1996 | Duyvesteyn et al. |
| 6,261,527 | B1 | 7/2001 | Arroyo et al. |

OTHER PUBLICATIONS

"Leaching of Some Australian Nickeliferous Laterites With Sulphuric Acid At Atmospheric Pressure", Canterford, John H., Proc. Australas. Inst. Min. Metall. No. 265, Mar. 1978.

* cited by examiner

Primary Examiner—Steven Bos
(74) Attorney, Agent, or Firm—Lynn C. Schumacher; Hill & Schumacher

(57) ABSTRACT

The present invention provides an atmospheric acid leaching process for leaching nickel and cobalt from highly-serpentinized saprolitic fractions of nickel laterite deposits that are generally too low in nickel to support economical extraction of their nickel contents by pyrometallurgical processing except under special circumstances, and generally too high in magnesium to be suitable for processing by modern high pressure acid leaching processes employed for treating predominantly limonitic nickel laterites. The process involves leaching the highly-serpentinized saprolitic portion of the nickel laterite ore profile in strong sulphuric acid solutions at atmospheric pressure and temperatures between 80° C. and 100° C., essentially autogenously, to extract at least 90% of its contained nickel content and a large proportion of its cobalt content after leaching reaction times of about one hour or less. The reaction times of one hour or less are comparable with the reaction times employed in the high temperature/high pressure leaching of limonitic laterites. The amount of sulphuric acid used in the leaching process is between about 80% and 100% by weight of the finely ground highly-serpentinized saprolite ore on a dry weight basis. The metal values are recovered as intermediate products.

33 Claims, 2 Drawing Sheets

DIRECT ATMOSPHERIC LEACHING OF HIGHLY-SERPENTINIZED SAPROLITIC NICKEL LATERITE ORES WITH SULPHURIC ACID

FIELD OF THE INVENTION

The present invention is directed to a method of processing highly-serpentinized saprolitic fractions of nickel laterite deposits, by atmospheric leaching with sulphuric acid, to obtain high degrees of extractions of their nickel and cobalt values.

BACKGROUND OF THE INVENTION

In the general practice of mining nickel laterite ores, that portion of the laterite ore profile that is saprolitic in nature, usually containing between 7% and 15% iron, between 15% and 20% magnesium, less than 0.05% cobalt, and between 1.7% and 2.2% nickel, is largely neglected. This stems from the fact that this fraction is found not to be ideally suited for economical extraction of its nickel and cobalt values by established conventional processing technologies, nor by the more recently developed high pressure acid leach technology. In some major nickel laterite mining practices, this segment of the laterite profile has normally been left behind, which is the case in two countries which host the world's largest known deposits of nickel laterite ores, namely Cuba and New Caledonia. (In New Caledonia, these remnant nickel saprolites are referred to as "petits minerais", being too "small" in nickel values to be of economic interest.)

For over a century, nickel laterite ores high in magnesia, relatively low in iron, and enriched in nickel usually containing over 2.2% nickel and more commonly at least 2.5% nickel, referred to either as garnierite ores or saprolite ores, have been processed by pyrometallurgical means to produce either a ferronickel, a Class II nickel product that could go directly to market for the production of stainless steels, or to produce an intermediate nickel sulphide product that could go to refineries for conversion to either Class I or Class II marketable nickel products. A good portion of the cobalt would be lost, some in the slag during the smelting stage, and in the case of ferronickel a good percentage of the cobalt would be present as an impurity of no value. Such metallurgical processes involve drying the humid ores, preheating them with or without effecting a partial reduction and subsequent reduction smelting at high temperatures in electric furnaces. It is axiomatic that such metallurgical processes consume high amounts of energy per unit of nickel production, and in most cases result in complete loss of value of the cobalt that accompanied the nickel in the ore.

About half a century ago, an ammoniacal leaching process was developed and commercialized which could treat lateritic ores high in iron and of low nickel content, commonly containing between 1.2% and 1.5% of nickel. It employed a combination of pyrometallurgical and hydrometallurgical technologies. The laterite ore is first dried and then subjected to partial reduction in Herreschoff furnaces or rotary kilns, at elevated temperatures but well below smelting temperatures, to selectively reduce the nickel and cobalt but only partially reduce the iron. This partially reduced calcine is then quenched and leached in ammoniacal carbonate solutions to dissolve nickel and cobalt; and the nickel is subsequently recovered from the ammoniacal leach solution as a nickel hydroxide/carbonate which would then be converted to a Class II nickel oxide or utility-grade nickel. In some cases the nickel leach solution would proceed to electrolytic refining for the production of electrically pure Class I nickel. Nickel recovery seldom exceeds 80% and recovery of by-product cobalt seldom exceeds 45%. While the hybrid pyrometallurgical-hydrometallurgical process could treat the high-iron low-magnesium and low-nickel laterite ores, often referred to as limonite ores, and is less demanding of energy requirements than the smelting process, the nickel recovery in actual continuous practice often drops to below 75% and the cobalt recovery drops to below 40%.

Research in the early 1950's demonstrated that by subjecting the high-iron, low-magnesium and low-nickel laterite ores, that is the limonites normally containing between 1.2% and 1.6% of nickel and between 0.1% and 0.25% of cobalt, directly in their humid state to sulphuric acid at elevated temperatures and pressures, that nickel and cobalt extractions of over 90% could be achieved with the energy requirement only a fraction of that required by the smelting or ammoniacal leaching processes. While this technology heralded a new era for the production of nickel and cobalt, only one commercial plant was built at Moa Bay in Cuba. This plant confined itself to the processing of limonites very low in magnesia contents, i.e., with les than 1% of magnesium oxide, and operated at around 240° C. and 475 psig. The product at the Moa Bay plant is an intermediate nickel-cobalt sulphide which is sent overseas for refining to marketable nickel and cobalt end products. This new hydrometallurgical technology has been further developed to operate at temperatures as high as 270° C. and 810 psig pressure. In recent years three pressure acid leach plants have been constructed in Australia, and were being commissioned in 1999/2000.

Saprolitic laterite ores from different sources, while possessing similarity in chemical composition, are prone to yielding very different results particularly when subjected to atmospheric leaching with sulphuric acid. The main difference between the saprolites is the degree of serpentinization. It has been observed that two deposits of saprolites situated side-by-side (usually separated by a geological fault) could be serpentinized to different degrees. It has also been observed that the saprolites from one region of a country hosting nickel laterite deposits can be very different from those in another region of that same country. These regions would normally be separated by one or more geological faults, by different geological structures or by mountain ranges. What distinguishes these two regions is that the rock remnants found in the lower profiles of a nickel laterite deposit in one case will not be highly serpentinized and will be low in nickel values, while the rock remnants in the other case will be highly-serpentinized and will contain higher concentrations of nickel and will be much softer and more readily broken.

An extensive laboratory study of atmospheric acid leaching of a large variety of laterites was carried out, see John H. Canterford "Leaching of some Australian nickeliferous laterites with sulphuric acid at atmospheric pressure", Australasian Institute of Mining and Metallurgy, No. 265, March 1978. He worked at a low pulp density of about 9% solids, at boiling point with reflux temperatures up to 107° C., with various strengths of sulphuric acid and for leaching times between 1 hour and 26 hours. With 3 out of 13 of his samples, he was able to achieve 90% or better extractions of nickel in seven hours of leaching, while employing about 1 part of acid per 1 part of laterite. By doubling the acid addition, 2 out of 13 samples yielded nickel extractions of 90% or better in one hour of leaching. He noted "the differences in reactivity of all the samples", as well as "the different behaviour of samples from within the same ore body." He concluded that "the results presented clearly indicate the problems involved in developing a process for treating these complex ores" Canterford suggested that atmospheric leaching should be considered where "there is a local high volume source of cheap sulphuric acid" and went on to say that "the economic viability of this approach cannot be assessed at this stage".

A process patent devoted to atmospheric acid leaching of saprolitic ore fractions, U.S. Pat. No. 4,410,498, assigned to Falconbridge Nickel Mines Limited teaches the use of $SO_2$ as a reducing agent to maintain a low redox potential so as to enhance the atmospheric leachability of the saprolite being processed, Even after 4 hours of leaching at 85° C., the maximum nickel extraction achieved was 80%.

Therefore it would be very advantageous to provide an economical, rapid method of processing highly-serpentinized saprolitic fractions of nickel laterite deposits to obtain high degrees of extraction of the nickel and cobalt content.

SUMMARY OF THE INVENTION

The present inventor has discovered that saprolites obtained from regions or locations where serpentinization has proceeded to the fullest degree, have the greatest chemical reactivity for reaction with acidic solutions to yield high extractions of their contained nickel and cobalt values.

The present invention is directed at treating such saprolitic ore fractions economically, for the recovery of their contained nickel as well as of their minor contents of cobalt, by an atmospheric acid leach process.

More particularly, the present invention is directed at processing the highly-serpentinized saprolitic fractions of nickel laterite deposits, by atmospheric leaching with sulphuric acid, to obtain high degrees of extractions of their nickel and cobalt values An advantage of the process of the present invention is that it operates at atmospheric pressure and confines itself to temperatures below 100° C., still yielding nickel extractions of at least 90%.

The present method of processing ores, by selecting the highly-serpentinized variety of saprolitic ores for atmospheric leaching with sulphuric acid, achieves nickel extractions of over 90% in one hour or less of leaching at leaching temperatures below 100° C. but above 80° C. and when satisfying approximately the theoretical requirements, i.e., about 1 part or slightly less (down to 0.8) of acid per 1 part of ore. These reaction times are comparable to those realized by pressure leaching of limonitic ores at elevated temperatures and pressures. Furthermore, the present invention teaches how to achieve the desired reaction temperature, virtually autogenously.

The present invention provides a process of leaching the highly-serpentinized saprolitic portion of a nickel laterite ore profile in strong sulphuric acid solutions at atmospheric pressure and temperatures above about 80° C., to extract at least about 90% of its contained nickel content and a large proportion of its cobalt content in reaction times of about one hour or less in either a batch or continuous manner.

The present invention provides a process of leaching a highly-serpentinized saprolitic fraction of a nickel laterite ore profile and recovering metal values therefrom, comprising the steps of:

preparing a finely ground highly-serpentinized saprolite ore;

pulping said finely ground highly-serpentinized saprolite ore with water to produce a pulped ore with a density of between about 15% and 33% solids;

heating said pulped ore;

adding sulphuric acid to the heated pulped ore at atmospheric pressure in an amount of at least about 80% by weight of the finely ground highly-serpentinized saprolite ore on a dry weight basis, wherein heat released by mixing said sulphuric acid with said pulped ore raises the temperature of the mixture to a reaction temperature of at least about 80° C.;

agitating the mixture for an effective period of time, whereby metal oxides are leached from the heated pulped ore mixed with sulphuric acid to produce a hot leach pulp;

separating said hot leach pulp into liquid and solids, wherein said liquid contains sulphates of said metals; and recovering an intermediate product containing nickel and cobalt from said liquid.

The present invention also provides a process of leaching a highly-serpentinized saprolitic fraction of a nickel laterite ore profile and recovering metal values therefrom, comprising the steps of:

preparing highly-serpentinized saprolite ore by crushing, screening and fine grinding;

pulping said finely ground highly-serpentinized saprolite ore with water to produce a pulped ore with a density of between about 15% and 33% solids;

heating said pulped ore;

adding sulphuric acid to the heated pulped ore at atmospheric pressure in an amount of at least about 80% by weight of the finely ground highly-serpentinized saprolite ore on a dry weight basis, wherein heat released by mixing the sulphuric acid with the pulped ore raises the temperature of the pulped ore to a reaction temperature of at least about 80° C.;

agitating the pulped ore mixed with sulphuric acid for an effective period of time, whereby metal oxides are leached from said hot pulped ore to produce a hot leach pulp;

separating said hot leach pulp into liquid and solids to produce a first leach solution containing sulphates of said metals and a first leach tailings fraction;

agitating and partially neutralizing the first leach solution with limestone for an effective period of time to precipitate dissolved iron contained therein, separating said partially neutralized first leach solution into liquid and solids to produce a clarified second leach solution and a second leach tailings fraction containing principally iron hydroxide and gypsum; and recovering an intermediate product containing nickel and cobalt from said clarified second leach solution.

The present invention also provides a process of leaching a highly-serpentinized saprolitic fraction of a nickel laterite ore profile and recovering metal values therefrom, comprising the steps of:

a) preparing a finely ground highly-serpentinized saprolite ore;

b) pulping said finely ground highly-serpentinized saprolite ore with water to produce a pulped ore with a density of between about 15% and 33% solids;

c) heating said pulped ore;

d) adding sulphuric acid to the heated pulped ore at atmospheric pressure in an amount of at least about 80% by weight of the finely ground highly-serpentinized saprolite ore on a dry weight basis, wherein heat released by mixing said sulphuric acid with said pulped ore raises the temperature of the mixture to a reaction temperature of at least about 80° C.;

e) agitating the mixture for an effective period of time, whereby metal oxides are leached from the heated pulped ore mixed with sulphuric acid to produce a hot leach pulp;

f) adding a first basic neutralizing agent to said hot leach pulp to precipitate principally iron present in said hot leach pulp thereby producing a partially neutralized hot leach pulp;

g) separating said partially neutralized hot leach pulp into liquid and solids, wherein said liquid contains sulphates of said metals; and h) recovering an intermediate product containing nickel and cobalt from said liquid.

BRIEF DESCRIPTION OF THE DRAWINGS

The process for direct atmospheric leaching of highly-serpentinized saprolitic nickel laterite ores in accordance with the present invention will now be described, by way of example only, reference being had to the accompanying drawings, in which.

DETAILED DESCRIPTION OF THE INVENTION

The present invention treats highly-serpentinized saprolitic nickel ores, high in magnesium, relatively low in iron, and normally containing over 1.5% but less than 2.2% nickel. These ores are generally considered to be too low in nickel to be processed economically by pyrometallurgical techniques, except in special circumstances. Because of their relatively low iron and high magnesium contents they are considered to be less than ideal feeds for processing by either (1) established atmospheric ammoniacal leaching technology or (2) by more recently developed pressure acid leaching technology encompassing digestion by sulphuric acid. Highly-serpentinized saprolite ores with nickel contents above 2.2% can also be treated by the present invention.

The present invention is directed to a process of leaching highly-serpentinized saprolitic ores, hydrometallurgically, at atmospheric pressure and temperatures preferably below 100° C. but above 80° C., to extract preferably over 90% of their contained nickel and over 80% of their contained cobalt in leaching times preferably of one hour or less.

Figure 1:
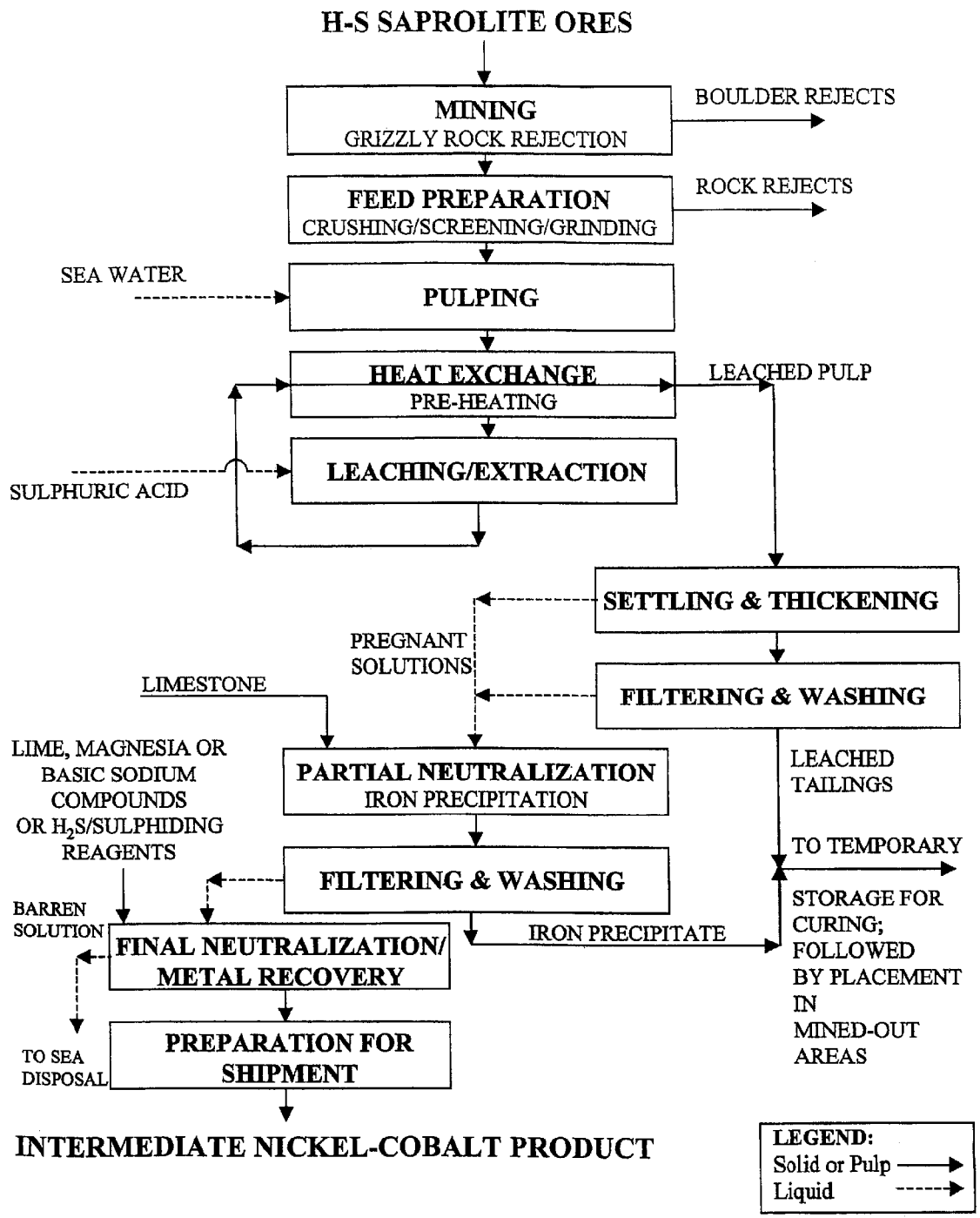
FIG. 1 shows a schematic flowchart incorporating the main features of the process of the present invention of atmospheric leaching of highly-serpentinized saprolite ore, with sulphuric acid to yield nickel extractions of over 90% in a leaching time of one hour or less, and to produce an intermediate nickel product.
Figure 2:
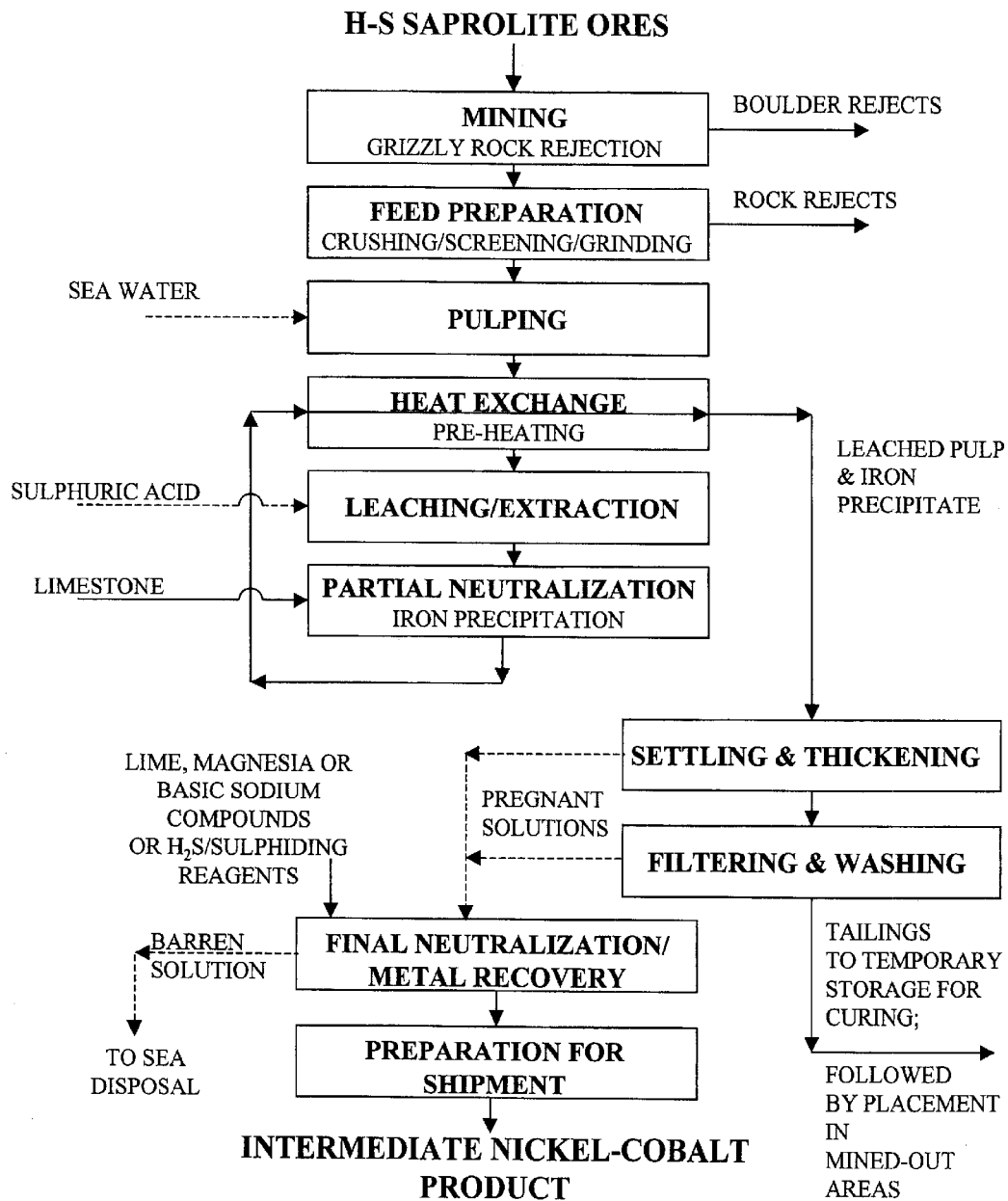
FIG. 2 shows a schematic flowchart which incorporates an advantageous variation of the present invention of atmospheric leaching of highly-serpentinized saprolite ore, with sulphuric acid to yield an intermediate product, wherein the partial neutralization step is carried out directly on the leached pulp, and only a single filtering and washing step is required to produce a neutralized pregnant solution that can proceed to metals recovery.

FIGS. 1 and 2 summarize the principal steps to be followed in commercial practice when operating in a continuous manner for the efficient working of the present invention. To start with, the highly-serpentinized ore experiences its first classification and upgrading at the mine site, on a heavy-duty grizzly onto which the run-of-mine ore is dumped by the haulage trucks. The oversized boulders that withstand the fall onto the grizzly are usually bedrock of low nickel content, and are rejected for return to the mined-out sites. Any highly-serpentinized saprolite boulders would normally break up in the drop and pass through the grizzly for delivery to the feed preparation plant.

At the feed preparation plant the saprolite ore is crushed and screened by conventional equipment, except that incorporation of a BARMAC crusher (Wajax Industries Limited, 3280 Wharton Way, Mississauga, Ontario, Canada, L4X 2C5) could prove to be very advantageous. The objective at this stage, besides breaking the ore down into finer fractions, is to remove as much of the low-grade rock fractions as possible. Being that the saprolite ores are mined from the bottom of the laterite profile, they are usually lumpy/chunky with moisture contents usually below 25%. Accordingly, it is usually possible to break them down into finer fragments in grinding units such as hammermills, particularly if they are highly-serpentinized. Alternatively, the final grinding could be carried out in a preheated air swept mill; or, in a more conventional wet grinding mill using rocks/boulders as the "pebbles" to effect the grinding.

The ground ore should preferably be essentially all of minus 48 mesh size, to be pulped with fresh water or sea water to a pulp density preferably between about 20% and 33% solids in a rotating type of vessel similar to a grinding mill but without any grinding medium. The main component of nickel saprolite ores is magnesium silicate mineral, also containing oxides of iron, nickel, cobalt and manganese. The essence of the present leaching process invention is the virtual destruction of the silicate mineral by acid dissolution of the bulk of its contained oxides including its large proportion of magnesium oxide, but without dissolving any appreciable amounts of its principal component, silica. Indeed, up to about one-half of the original ore, on a dry weight basis, is taken into solution. Accordingly, the solubility of the resultant metal sulphates must be taken into account when establishing the solids-to-liquid ratio, i.e., the pulp density of the leach pulp. While magnesium sulphate is highly soluble at leaching temperatures of around 90° C. where one part of sulphuric acid solution per one part of ore analyzing about 30% MgO, would be sufficient to contain it all, its solubility drops to about ⅓ when cooled to room temperature. Thus, at room temperature it would require some 3 parts of sulphuric acid solution per 1 part of ore in the feed pulp, i.e. a pulp density of about 25% to contain all of the magnesium sulphate in solution. This consideration sets a maximum desirable leach pulp density.

Those skilled in the art recognize that moving away from saturation normally enhances rate of reaction and degree of extraction i.e. dilution generally facilitates a leaching process, a fact that favours operating at lower pulp densities. However, in commercial practice, operating at lower pulp densities requires more and larger equipment for leaching, pumping, filtering, etc. Thus, one needs to arrive at a practical, optimal level of dilution. In the working of the present invention, employing a ratio of 5–6 parts of sulphuric acid solution to 1 part of ore in the leach pulp will ensure the desired metal extractions while taking practical/commercial factors into consideration. Accordingly, a pulp density in leach pulp of about 15% is deemed to be the low end of the desirable working range.

The need to operate at the lower end of this range of leach pulp densities is essential if the process alternative depicted in FIG. 2 is adopted, since the final leached and partially neutralized pulp will be carrying the precipitated iron hydroxides and gypsum in addition to the leached ore tailings. The iron hydroxides, in particular, tend to thicken the pulp, which is an additional reason for starting off at the low end of the range. A lower initial leach pulp density also facilitates subsequent filtration and washing of the leached and precipitated solids.

Those skilled in the art will appreciate that the feed pulp density after pulping the finely ground ore with water will be higher than the leach pulp density after the sulphuric acid has been added. The feed pulped ore densities therefore should be of the order of about 20% to 33% solids before addition of sulphuric acid to yield leach pulp densities between about 15% and about 25% solids.

After grinding and pulping the feed pulp passes through the shell side of a shell-and-tube heat exchanger for pre-heating to temperatures of 50° C. to 60° C. on route to the leaching tanks that are built of corrosion resistant stainless steels or of titanium-clad steels and are externally insulated for maximum heat retention. It may be advantageous to line these tanks with acid brick to better withstand the highly corrosive conditions. Sulphuric acid is introduced to the leaching tanks in amounts of up to 100% by weight of the feed ore, on a dry basis, and at a rate synchronized with the ore feed rate, to raise the temperature of the pulp in the first leaching tank to about 90° C., or even higher, as a result of its heat of solution. The leaching tanks, two or more, are arranged in series and are sized so as to provide about one hour of total retention time for the feed ore. Agitation of these leaching tanks may be best carried out by pump circulation of the leaching pulp, which necessitates that this auxiliary equipment also be built of corrosion resistant materials. The leaching process is monitored by measuring the pH of the leached pulp emanating from the last leach tank, which is maintained at pH levels between 1.5 and 2.0.

In the working of the present invention, pH measurements play key roles in monitoring the progress of the principal transformation reactions at each major step, and provide the basis for making adjustments and thereby controlling the efficacy of each such step. In the principal step of leaching, while the pulped ore feed rate, the density of the pulped ore, and acid addition are set and synchronized at rates and levels dependant primarily on the given/estimated assays of the ore, the progress of the actual leaching reactions is continuously monitored by pH measurements. The objective is to arrive with a pH between about 1.5 and 2.0 in the leached pulp. If the pH is significantly below 1.5, this indicates that excess acid is being added at the feed end or that the leaching reactions have not yet proceeded to practical completion. If, on the other hand, the pH is significantly above 2.0, it is indicative that inadequate amounts of acid are being added in relation to the pulped ore feed to achieve maximum degrees of extraction of the metal values.

After leaching, the leached ore can proceed to partial neutralization and subsequent recovery of intermediate products containing the metal values of interest, by one of two routes as depicted in the process flowcharts of FIGS. 1 and 2.

In FIG. 1, the hot leached pulp after passing back through the tube side of the sheet- and-tube heat exchanger, proceeds to filtering and washing. The clarified solutions making up the pregnant solution pass on to the partial neutralization tanks for reaction with finely ground limestone to a pH of at least 4.0. In this step of partial neutralization with limestone, pH measurements of the final partially neutralized leach pulp are taken and used to control the quantity of limestone being added. A pH level between about 4.0 and 4.5 is the preferred range to insure precipitation of substantially all the iron without simultaneously precipitating any of the nickel.

The filtered and washed leached tailings filter cake proceeds to temporary storage in preparation for eventual placement in mined-out areas. The neutralization tanks, also constructed of corrosion resistant steels, or plastic or plastic lined steels, are arranged two or more in series and are sized to provide for a total retention/reaction time of up to one hour. The partially neutralized pulp then passes on to filtering and washing, and the clarified pregnant solution proceeds to metals recovery; while the filtered and washed iron and gypsum precipitates are delivered to temporary storage where they are first mixed with the leached ore tailings filter cake for curing, whereby the partial setting of the gypsum gives the mixed cake a measure of firmness within a period of several days.

The cured/partially-set cake can be picked up by front end shovels and loaded onto trucks for delivery to permanent placement areas. The metals recovery from the clarified partially neutralized pregnant solution, to produce an impure intermediate nickel product, can be carried out in a variety of practical/economical ways, with the choice depending principally upon the requirements of the receiving refinery. Precipitating reagents can be one of: lime, magnesia or basic sodium compounds such as soda ash; or $H_2S$ or other sulphiding compound. In the first case, the basic precipitating reagents would be added in amounts that would raise the pH to about 8.3 for complete precipitation of the contained nickel; while in the latter case the sulphide precipitation would start out at the pH of the pregnant solution, and then end up at around 7.5 upon completion of the precipitation. Therefore this third major step of producing the final intermediate nickel product, by precipitation, is also monitored by pH measurements, with the desired pH levels dependant on the particular method adopted and the chemistry of the precipitation reactions. The final barren solutions produced would need to have their pH raised to remove residual base metal impurities such as manganese, prior to disposal to the sea.

The final physical form of the intermediate nickel product, whether it be a pulp, a dry or wet filter cake, or a dried solid will depend on the method and cost of preparation, on the method and cost of transportation as well as on the needs of the receiving customers; and facilities chosen for preparing the product for shipment should preferably be the most economical.

In FIG. 2, the hot leached pulp moves on to the partial neutralization step wherein fine limestone is added to the hot leach pulp to raise the pH level to about 4.0, before it passes back through the tube side of the shell-and-tube heat exchanger. The composite pulp, carrying the leached ore tailings and the iron and gypsum precipitates then passes on to thickening and filtering. The clarified pregnant solution moves on to metals recovery as already described in relation to the flowchart of FIG. 1; and the filtered and washed solid residues go to temporary storage for curing and subsequent placement in mined-out areas.

Those skilled in the art will appreciate that in the processes illustrated by the schematic flowcharts of FIGS. 1 and 2, the limestone, lime, magnesia or other basic neutralizing agents may be added finely ground and dry, or finely ground and pulped where the pulping medium could be fresh water, sea water or barren solution, as deemed appropriate.

Those skilled in the art will appreciate that rather than employing filters, the liquid-solids separation may be carried out by conventional counter-current-decantation systems using thickeners. This may be preferable when the leached tailings and iron hydroxide-gypsum precipitates are to be placed in slurry form.

A very surprising and significant result achieved with the present process of processing ores is that by selecting the highly-serpentinized variety of saprolitic ores for atmospheric leaching with sulphuric acid, nickel extractions of over 90% in one hour or less of leaching are obtained at reaction temperatures between 80° C. and 100° C. when employing one part or slightly less of acid per one part of ore. These reaction times are comparable to those realized by pressure leaching at elevated temperatures and pressures of limonitic ores. Furthermore, the leaching process is substantially thermally autogenous, in other words by heating the pulped ore in the heat exchanger as it is being introduced into the leaching tanks using the hot leached ore pumped from the tanks through the heat exchanger combined with the heat of solution released upon mixing the sulphuric acid and pulped ore provide the necessary leaching temperature without the application of external heat.

The present invention will now be illustrated by the following non-limiting examples of the process.

EXAMPLES

Leaching tests were conducted on seven different saprolite samples, from four geographically separated regions, and of two varieties: one from regions where the magnesium silicate minerals hosting the nickel and cobalt had been highly-serpentinized (H-S), and the other from regions where the magnesium silicate minerals hosting the nickel and cobalt had been less-than-fully-serpentinized (L-T-F-S). One objective of the examples is to demonstrate that highly-serpentinized nickel saprolite ores when treated by atmospheric acid leaching according to the present invention, will yield high nickel extractions comparable to those achieved by pressure acid leaching of limonitic ores, and in comparable reaction times. The examples also demonstrate the workings of the present invention, whereby reaction temperatures approaching the boiling point can be achieved without the application of external heat. A chemical description of the various saprolites tested is given in Table 1.

TABLE 1

Chemical composition of saprolite ores tested

| Ore Description | Composition wt % | | | | | | | | |
|---|---|---|---|---|---|---|---|---|---|
| | Ni | Co | Mn | Fe | MgO | $SiO_2$ | $Al_2O_3$ | $Cr_2O_3$ | LOI |
| M1(H-S) | 1.92 | 0.02 | 0.11 | 7.3 | 32.0 | 39.2 | 0.6 | 0.5 | 14.0 |
| M3(H-S) | 3.34 | 0.18 | 0.16 | 11.0 | 30.0 | 42.7 | 0.7 | 0.4 | 12.5 |
| N9(H-S) | 2.90 | 0.02 | 0.12 | 8.4 | 30.5 | 43.3 | 0.4 | 0.4 | 12.0 |
| K(L-T-F-S) | 2.33 | 0.03 | 0.13 | 14.3 | 24.8 | 36.7 | n.a. | n.a. | 11.8 |
| O(L-T-F-S) | 2.64 | 0.04 | 0.09 | 14.4 | 26.1 | 33.2 | n.a. | n.a. | 12.7 |
| MX1(H-S) | 2.63 | 0.10 | 0.13 | 9.2 | 31.0 | 40.9 | 0.7 | 0.5 | 13.3 |
| MX2(H-S) | 2.35 | 0.08 | 0.13 | 8.4 | 31.4 | 40.3 | 0.6 | 0.5 | 13.6 |

Notes:
"H-S" refers to highly-serpentinized ores.
"L-T-F-S" refers to less-thankfully-serpentinized ores

Example 1

A series of exploratory tests were firstly carried out on the highly-serpentinized saprolite ore, M1, to obtain a general idea of its amenability to atmospheric leaching with sulphuric acid. As can be seen in tests M1-T1 and M1-T3 from Tables 2 and 3, very high degrees of extractions were obtained even at room temperatures; however very long reaction times of two or more days were required, and the resulting leached pulp had very poor settling and filtering characteristics. Remarkably, over 95% of the nickel and cobalt were extracted in just one hour of leaching when a temperature of 89° C. was employed; and the resulting leached tailings settled and filtered very well, as shown by test M1-T2

A second series of tests, M1-T6, M1-T7 and M1-T8 were carried out in which sea water obtained from the Pacific Ocean replaced the fresh water for pulping, and in which the leached pulp was directly subjected to partial neutralization with fine $CaCO_3$, to precipitate out the dissolved iron before proceeding to filtration and washing, to yield a pregnant solution for metals recovery into an impure intermediate nickel product.

The results given in Tables 2 and 3, indicate that the filtered solids in tests M1-T6 Step2 and M1-T7 were not adequately washed; while a good extraction was realized in test M1-T8 in which the leaching was conducted at a lower pulp density and a more adequate degree of washing was carried out. It is noteworthy that the solids residue containing the iron precipitate as well as the leached ore tailings did not settle or filter nearly as rapidly as the leached tailings by themselves as in test M1-T2 for example.

TABLE 2

Atmospheric leaching of highly-serpentinized saprolite ores; Leaching conditions

| Ore Samples | Charge g | H$_2$O g | H$_2$SO$_4$ g | H$_2$SO$_4$ % of Ore | H$_2$SO$_4$ % Theo. | Pulp % Solid | Preheat °C. | React'n °C. | Time Hr | pH Final |
|---|---|---|---|---|---|---|---|---|---|---|
| M1-T1 | 50 | 175 | 41 | 82 | 90 | 19 | none | 23 | 65 | 1.9 |
| M1-T2 | 50 | 150 | 47 | 94 | 104 | 20 | none | 89 | 1.0 | 2.2 |
| M1-T3 | 50 | 111 Sea Water | 47 | 94 | 104 | 24 | none | 31 | 46 | 1.2 |
| M1-T6 | | | | | | | | | | |
| Step 1 | 50 | 150 | 45 | 90 | 100 | 20 | 50 | 82 | 0.8 | 1.8 |
| Step 2 | 6.2 g of CaCO$_3$ added for partial neutralization | | | | | | none | 45 | 0.2 | 4.6 |
| M1-T7 | | | | | | | | | | |
| Step 1 | 50 | 150 | 47 | 94 | 104 | 20 | 60 | 89 | 1.0 | 2.1 |
| Step 2 | 6.5 g of CaCO$_3$ added for partial neutralization | | | | | | none | 43 | 1.0 | 3.9 |
| M1-T8 | | | | | | | | | | |
| Step 1 | 50 | 200 | 47 | 94 | 104 | 17 | 60 | 87 | 1.0 | 1.2 |
| Step 2 | 10.0 g of CaCO$_3$ added for partial neutralization | | | | | | none | 34 | 0.3 | 5.4 |

TABLE 3

Atmospheric leaching of highly-serpentinized saprolite ores; Metal extractions

| Ore Samples | Filter-ability † | Cake % H$_2$O | Residue g | Ni | Co | Mn | Fe | MgO | SiO$_2$ | SO$_3$ |
|---|---|---|---|---|---|---|---|---|---|---|
| M1-T1 | vp | 43 | 27.4 | 0.18 | .002 | 0.04 | 3.6 | 12.2 | 64.6 | — |
|  |  |  |  | 95 | 96 | 80 | 72 | 79 | 0 |  |
| M1-T2 | g | 48 | 24.2 | 0.15 | .001 | 0.02 | 3.4 | 7.4 | 75.0 | — |
|  |  |  |  | 96 | 97 | 90 | 76 | 79 | 0 |  |
| M1-T3 | p | 47 | 25.3 | 0.15 | .002 | 0.02 | 3.1 | 8.8 | 68.0 | — |
|  |  |  |  | 96 | 95 | 90 | 79 | 86 | 0 |  |
| M1-T6 Step 1 |  |  |  | 0.26 | Tr | 0.02 | 3.8 | 8.6 | 78.7 | — |
|  |  |  |  | 93 | — | 90 | 70 | 87 | — |  |
| M1-T6 Step 2 | f | 57 | 47.2 | 0.52 | Tr | 0.03 | 7.5 | 7.0 | 33.0 | 30.5 |
|  |  |  |  | 74 | — | 74 | 3 | 80 | — |  |
| M1-T7 Step 2 | p | 52 | 55.1 | 0.50 | Tr | 0.03 | 7.5 | 7.7 | 30.5 | 32.2 |
|  |  |  |  | 71 | — | 70 | 0 | 74 | — |  |
| M1-T8 Step 2 | f | 55 | 45.5 | 0.14 | Tr | Tr | 7.2 | 3.1 | 37.0 | 18.2 |
|  |  |  |  | 93 | — | — | 10 | 91 | — |  |

Notes:
*- The analyses of leach solutions indicated less than 0.5% dissolution of SiO$_2$.
†- The designation of the relative filtering rate. Very poor-vp; Poor-p; Fair-f; Good-g; Very good-vg.

The pregnant solutions produced by leaching the "M1" ores in the first series of tests, which analyzed 4.6 gpl Ni, 0.15 gpl Co, 17.7 gpl Fe and 54.6 gpl Mg when combined, were subjected to partial neutralization with CaCO3 at an average temperature of 57° C. The first filtrate at pH 3.7 analyzed 5.1 gpl Ni, 0.06 gplCo, 0.5 gpl Fe and 53.4 gpl Mg. After two washings there was still some soluble nickel remaining in the residue as the second wash water still contained 1.2 gpl Ni and the overall nickel recovery was 88%. It was noteworthy that washing of the iron-gypsum filter cake proceeded much more rapidly than the original filtration, suggesting that further washing would yield an improved overall recovery of the nickel.

The exceptionally high extractions achieved at room temperatures, suggest that highly-serpentinized saprolite ores could be potential candidates for heap leaching.

Example 2

In another series of tests, two other saprolite samples from regions where the saprolites were expected to be very highly serpentinized, were leached atmospherically with sulphuric acid, with sea water obtained from the Pacific Ocean to replace fresh water for pulping, to see if the very high nickel extractions of over 90% in a reaction time of one hour could be replicated. The results shown in tables 4 and 5 confirm the previous exceptionally high nickel extractions. These tests, along with previous tests in Example 1 that employed sea water for pulping, demonstrate that sea water is an appropriate medium for pulping the ore, which is an important beneficial factor in commercializing the present invention.

TABLE 4

Atmospheric leaching of highly-serpentinized saprolite ores from other regions; Leaching conditions

| Ore Samples | Charge g | SW* g | $H_2SO_4$ g | $H_2SO_4$ % or Ore | $H_2SO_4$ % Theo. | Pulp % Solid | Preheat ° C. | React'n ° C. | Time Hr | pH Final |
|---|---|---|---|---|---|---|---|---|---|---|
| M3-T1 | 50 | 200 | 45 | 90 | 94 | 17 | 60 | 85 | 1.0 | 1.75 |
| N9-T1 | 50 | 200 | 45 | 90 | 99 | 17 | 60 | 86 | 1.0 | 2.15 |

*- Sea Water

TABLE 5

Atmospheric leaching of highly-serpentinized saprolite ores from other regions; metal extractions

| Ore Samples | Filterability † | Cake % $H_2O$ | Residue g | Ni | Co | Mn | Fe | MgO | $SiO_2$ |
|---|---|---|---|---|---|---|---|---|---|
| M3-T1 | f | 50 | 27.1 | 0.45 | 0.01 | 0.04 | 10.4 | 4.3 | 64.6 |
|  |  |  |  | 92.7 | 97 | 86 | 49 | 92 | — |
| N9-T1 | g | 52 | 27.6 | 0.22 | .006 | 0.04 | 7.3 | 4.5 | 74.0 |
|  |  |  |  | 96.6 | 84 | 82 | 52 | 92 | — |

Notes:
†- The designation of the relative filtering rate. Very poor-vp; Poor-p; Fair-f; Good-g; Very good-vg.

The pregnant solutions produced by leaching the "M3" and "N9" saprolites of the second series of tests, analyzed 5.6 gpl Ni, 0.19 gpl Co, 0.27 gpl Mn, 9.8 gpl Fe, 30.5 gpl Mg and had a pH of 1.14. Partial neutralization was with $CaCO_3$ to a pH of 3.7. After filtering and washing, over 98% of the nickel was recovered in the filtrate, but only 53% of the iron was precipitated suggesting that the partial neutralization should have proceeded to a higher pH level of at least 4.0. The partially neutralized filtrate solutions were then further neutralized first by the addition of $CaCO_3$ to a pH of about 5.6 and subsequently with CaO to a pH of about 7.0. The very dark green precipitate settled and filtered very, very rapidly; however, it was obvious from subsequent analysis of the precipitate which contained 5.3% Ni, 0.2% Co, 0.1% Mn, 6.2% Fe, 5.9% MgO, 37.2% CaO and 19.3% SO3, that the terminal pH of 7.0 was too low as only 45% of the nickel reported in the final solid product. For complete recovery of the nickel, pH levels above 8.0 are required.

Example 3

In a third series of tests, saprolite ore samples from two widely separated geographical regions of the same country, from opposite coasts but from geological environments thought to be similar with regard to hosting saprolites that were less-than-fully-serpentinized, were atmospherically leached for comparison with results from Examples 1 and 2.

It can be seen from the results summarized in Tables 6 and 7 that saprolite ores from regions where serpentinization had not proceeded to the fullest degree yielded a maximum nickel extraction of 76% in one hour's leaching, and a maximum of 89% after two hours of leaching.

TABLE 6

Atmospheric leaching of highly-serpentinized saprolite ores from two geographically separated regions with certain geological similarities; Leaching conditions

| Ore Samples | Charge g | $H_2O$ g | $H_2SO_4$ g | $H_2SO_4$ % of Ore | $H_2SO_4$ % Theo. | Pulp % Solid | Preheat ° C. | React'n ° C. | Time Hr | pH Final |
|---|---|---|---|---|---|---|---|---|---|---|
| K-T1 | 50 | 160 | 40 | 80 | 93 | 20 | none | 90 | 1.0 | 1.5 |
| K-T2 | 50 | 150 | 50 | 100 | 114 | 20 | none | 87 | 2.0 | 1.2 |
| O-T1 | 50 | 150 | 50 | 100 | 109 | 20 | none | 85 | 2.2 | 1.1 |
| O-T2 | 50 | 100 | 45 | 90 | 98 | 26 | 50 | 90 | 1.0 | 1.0 |
| O-T3 | 50 | 100 | 45 | 90 | 98 | 26 | 50 | 89 | 2.0 | 1.2 |

TABLE 7

Atmospheric leaching of less-than-fully-serpentinized saprolite ores from two geographically separated regions with certain geological similarities; Metal extractions

| Ore Samples | Filter-ability † | Cake % H$_2$O | Residue g | Residue Analysis wt % / % Metal Leached/Extracted | | | | | |
|---|---|---|---|---|---|---|---|---|---|
| | | | | Ni | Co | Mn | Fe | MgO | SiO$_2$ |
| K-T1 | f | 45 | 31.6 | 0.87 | n.a. | 0.05 | 15.5 | 4.2 | 61.7 |
| | | | | 76 | — | 76 | 32 | 90 | — |
| K-T2 | f | n.a. | 24.4 | 0.53 | Tr | 0.04 | 9.4 | 3.2 | 74.9 |
| | | | | 89 | — | 87 | 68 | 94 | — |
| O-T1 | f | 46 | 22.9 | 0.76 | 0.02 | 0.07 | 11.0 | 4.8 | 70.9 |
| | | | | 87 | 82 | 67 | 65 | 93 | — |
| O-T2 | f | 44 | 40.6 | 1.05 | 0.03 | 0.07 | 15.9 | 7.0 | 54.8 |
| | | | | 68 | 49 | 47 | 10 | 78 | — |
| O-T3 | f | 43 | 31.3 | 0.92 | Tr | 0.07 | 12.2 | 6.6 | 59.1 |
| | | | | 78 | — | 52 | 47 | 84 | — |

Notes:
†- The designation of the relative filtering rate. Very poor-vp; Poor-p; Fair-f; Good-g; Very good-vg.

The pregnant solutions produced by leaching the "K" and "O" saprolite ores when combined, analyzed 5.4 gpl Ni, 0.14 gpl Co, 18.8 gpl Fe and 40.0 gpl Mg. They were subjected to partial neutralization with CaCO$_3$, at room temperature of 22° C., to a pH of 4.0. After filtering, the filtrate analyzed 5.4 gplNi, 0.14 gpl Co, only 0.7 gpl Fe and 40.5 gpl Mg. The nickel recovery in the filtrate was only 73%, as the solid iron-gypsum precipitate was not adequately washed. The filtrate combined with the first washing, after partial neutralization, and analyzing 4.6 gpl Ni, 0.13 gpl Co, 0.6 gpl Fe, 35 gpl Mg and with a pH of 3.6, was subjected to further neutralization with CaO to a pH of 8.1 to precipitate the metal values along with the remaining iron. The resulting product precipitate filtered very, very rapidly. The final impure intermediate nickel product, after filtering and drying, analyzed 18.7% Ni, 0.63% Co, 0.2% Mn, 3.0% Fe, 2.2% MgO, 20,5% CaO and 27.9% SO$_3$.

Example 4

To demonstrate and compare the flowcharts as depicted in FIGS. 1 and 2 (which can be referred to as the "3-stage" and "2-stage" metal extraction/neutralization/recovery alternatives respectively) two samples, MX1 and MX2, were carried through leaching, followed by partial neutralization with calcium carbonate and final precipitation of nickel (and associated cobalt) with sodium sulphide to produce intermediate sulphide products.

TABLE 8

Atmospheric leaching of highly-serpentinized saprolite ores; Extraction/Neutralization/Recovery into final Intermediate Sulphide Product

| Ore Samples | Weights of Reactants | | | | | | Leaching Conditions | | | |
|---|---|---|---|---|---|---|---|---|---|---|
| | Charge g | H$_2$O g | H$_2$SO$_4$ g | H$_2$SO$_4$ % of Ore | H$_2$SO$_4$ % Theo. | Pulp % Solid | Preheat ° C. | React'n ° C. | Time Hr | pH Final |
| MX1 | 50 | 200 | 45 | 90 | 94 | 17 | 60 | 88 | 1.0 | 1.70 |
| Add ~10 g of CaCO$_3$ to the leach pulp | | | | | | | | 82 | 0.2 | 3.00 |
| Add 1.7 g of CaO to leach filtrate | | | | | | | | 50 | 0.3 | 4.96 |
| Add 2.48 g of Na$_2$S (60%) to partially neutralized filtrate | | | | | | | | 42 | 0.25 | 7.52 |
| Add 0.22 g of CaO to 'stripped' filtrate | | | | | | | | 44 | 0.2 | 8.93 |
| MX2 | 50 | 200 | 45 | 90 | 94 | 17 | 60 | 90 | 1.0 | 1.66 |
| Add 6.43 g of CaCO$_3$ to the leach filtrate | | | | | | | | 50 | 0.25 | 4.60 |
| Add 2.58 g of Na$_2$S (60%) to partially neutralized filtrate | | | | | | | | 40 | 0.15 | 7.70 |
| Add 0.18 g of CaO to 'stripped' filtrate | | | | | | | | 44 | 0.20 | 9.04 |

*- Sea Water

TABLE 9

Atmospheric leaching of highly-serpentinized saprolite ores; Extraction/Neutralization/Recovery into final Intermediate Sulphide Product

| Ore Samples | Filter ability † | Cake % H₂O | Residue g | Residue Analysis Wt %¤ % Metal Leached/Extracted/Recovered | | | | | | | |
|---|---|---|---|---|---|---|---|---|---|---|---|
| | | | | Ni | Co | Mn | Fe | MgO | SiO₂ | SO₃ | S |
| MX1 leached + | p | 56 | 41.6+ 4.0 | 0.34 88.2 | .015 86 | 0.02 86 | 10.3 0 | 2.5 88 | 47.4 — | 16.8 — | — — |
| neutralized | | | 45.6 | | | | | | | | |
| After Na₂S precipitation | vg | 73 | 3.2 | 39.32 95.4 | 1.42 90 | 0.22 11 | 3.1 2 | 6.7 2 | — — | — — | 16.8 88.5 |
| MX1 leached | g | 48 | 27.0 | 0.38 91.3 | .013 91 | 0.02 92 | 6.0 61 | 3.4 91 | 82.5 — | — — | — — |
| After neutralized | f | 79 | 13.9 | 0.11 90.0 | — 91 | — 92 | 17.7 3 | 0.2 90 | 0.3 — | 39.1 — | — — |
| After Na₂S precipitation | vg | 80 | 3.0 | 47.27 100 | 1.31 98 | 0.22 10 | 3.7 2 | 4.0 2 | — — | — — | 17.7 84.0 |

Notes:
†- The designation of the relative filtering rate. Very poor-vp; Poor-p; Fair-f; Good-g; Very good-vg.
¤- All solids analyses, including the ore head samples, were carried out by X-ray fluorescence, and are the basis for calculating extractions and recoveries, and all recoveries are based on the metal contents of the ore head samples.

As can be seen from the results shown in Table 9, the 3-stage alternative (MX2) yields higher overall recovery of the nickel by at least 2 percentage points, as well as higher overall cobalt recovery. It is significant to note the useful degree of separation of manganese from the nickel and cobalt, as the Ni:Mn ratio in the ore feeds were about 20:1 while the Ni:Mn ratio in the intermediate sulphide product was about 200:1. The final "stripped" filtrates were free of Ni, Co, Cu, Zn but still contained traces of Mn along with the bulk of the magnesium that was leached from the saprolites.

Those skilled in the art will appreciate that H₂S is most commonly used for sulphide precipitation in industrial processes where large quantities are involved.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

I claim:

1. A process of leaching a highly-serpentinized saprolitic fraction of a nickel laterite ore profile and recovering metal values therefrom, comprising the steps of:
    preparing a finely ground highly-serpentinized saprolite ore;
    pulping said finely ground highly-serpentinized saprolite ore with water to produce a pulped ore with a density of between about 15% and 33% solids;
    heating said pulped ore;
    adding sulphuric acid to the heated pulped ore at atmospheric pressure in an amount of at least about 80% by weight of the finely ground highly-serpentinized saprolite ore on a dry weight basis, wherein heat released by mixing said sulphuric acid with said pulped ore raises the temperature of the mixture to a reaction temperature of at least about 80° C.;
    agitating the mixture for an effective period of time, whereby metal oxides are leached from the heated pulped ore mixed with sulphuric acid to produce a hot leach pulp;
    separating said hot leach pulp into liquid and solids, wherein said liquid contains sulphates of said metals; and
    recovering an intermediate product containing nickel and cobalt from said liquid.

2. The process according to claim 1 wherein said leaching takes place in leaching tanks, and wherein said sulphuric acid is introduced into said leaching tanks at a rate synchronized with a pulped ore feed rate into said leaching tanks, and wherein said pulped ore is heated prior to being pumped into said leaching tanks by means of indirect heat exchange with hot leach pulp leaving said leaching tanks, and wherein said pulped ore is further heated directly in the leaching tanks to said reaction temperature of at least 80° C. by the heat released by mixing said pulped ore with said sulphuric acid.

3. The process according to claim 2 wherein said step of separating said hot leach pulp into liquid and solids includes
    a) separating said hot leach pulp into liquid and solids to produce a first leach solution containing sulphates of said metals and a first leach tailings fraction;
    b) agitating and partially neutralizing the first leach solution with limestone for an effective period of time to precipitate principally dissolved iron contained therein,
    c) separating said partially neutralized first leach solution into liquid and solids to produce a clarified second leach solution and a second leach tailings fraction containing principally iron hydroxide and gypsum, and
    recovering said intermediate product from said clarified second leach solution.

4. The process according to claim 3 wherein said hot leach pulp leaving said leaching tanks is pumped through a heat exchanger having inner and outer chambers separated by heat conducting walls, and wherein said hot leach pulp is pumped through one chamber while said pulped ore is pumped through the other chamber of said heat exchanger thereby heating the pulped ore by transfer of heat from the hot leach pulp through the heat conducting walls.

5. The process according to claim 3 wherein said pulped ore is leached for about 1 hour.

6. The process according to claim 3 wherein said water is sea water.

7. The process according to claim 3 wherein said heat produced by mixing said sulphuric acid with said pulped ore raises the temperature of the mixture to a reaction temperature of at least about 85° C.

8. The process according to claim 4 wherein the first leach solution is partially neutralized with limestone in an amount needed to give a pH of about 4.0 to 4.5 to precipitate substantially any dissolved iron and aluminum present.

9. The process according to claim 8 wherein said step of recovering an intermediate product from said clarified second leach solution includes neutralization of said clarified second leach solution with a basic oxide selected from the group consisting of lime and magnesia to produce an intermediate nickel-cobalt hydroxide product.

10. The process according to claim 8 wherein said step of recovering an intermediate product from said clarified second leach solution includes neutralization of said clarified second leach solution with soda ash to produce an intermediate nickel-cobalt hydroxide/carbonate product.

11. The process according to claim 8 wherein said step of recovering an intermediate product from said clarified second leach solution includes addition of a sulphiding agent to produce an intermediate nickel-cobalt sulphide product.

12. The process according to claim 11 wherein said sulphiding agent is hydrogen sulphide or a sodium sulphide compound.

13. The process according to claim 3 including monitoring of pH of said mixture of pulped ore and sulphuric acid in said leaching tanks, including regulating sulphuric acid additions into said leaching tanks to give a pH of said mixture in a range from about 1.0 to 2.0 in the hot leach pulp upon completion of leaching.

14. A process of leaching a highly-serpentinized saprolitic fraction of a nickel laterite ore profile and recovering metal values therefrom, comprising the steps of:
   preparing highly-serpentinized saprolite ore by crushing, screening and fine grinding;
   pulping said finely ground highly-serpentinized saprolite ore with water to produce a pulped ore with a density of between about 15% and 33% solids;
   heating said pulped ore;
   adding sulphuric acid to the heated pulped ore at atmospheric pressure in an amount of at least about 80% by weight of the finely ground highly-serpentinized saprolite ore on a dry weight basis, wherein heat released by mixing the sulphuric acid with the pulped ore raises the temperature of the pulped ore to a reaction temperature of at least about 80° C.;
   agitating the pulped ore mixed with sulphuric acid for an effective period of time, whereby metal oxides are leached from said hot pulped ore to produce a hot leach pulp;
   separating said hot leach pulp into liquid and solids to produce a first leach solution containing sulphates of said metals and a first leach tailings fraction;
   agitating and partially neutralizing the first leach solution with limestone for an effective period of time to precipitate dissolved iron contained there in,
   separating said partially neutralized first leach solution into liquid and solids to produce a clarified second leach solution and a second leach tailings fraction containing principally iron hydroxide and gypsum; and
   recovering an intermediate product containing nickel and cobalt from said clarified second leach solution.

15. The process according to claim 14 wherein said leaching takes place in leaching tanks, and wherein said sulphuric acid is introduced into said leaching tanks at a synchronized rate with a pulped ore feed rate into said leaching tanks, and wherein said pulped ore is indirectly heated prior to being pumped into said leaching tanks by means of heat exchange with hot leach pulp leaving said leaching tanks, and wherein said pulped ore is further heated directly in the leaching tanks to said reaction temperature of at least 80° C. by the heat released by mixing sa id pulped ore with said sulphuric acid.

16. The process according to claim 15 wherein said hot leach pulp leaving said leaching tanks is pumped through a heat exchanger having inner and outer chambers separated by heat conducting walls, and wherein said hot leach pulp is pumped through one chamber while said pulped ore is pumped through the other chamber of said heat exchanger thereby heating the pulped ore by transfer of heat from the hot leach pulp through the heat conducting walls.

17. The process according to claim 15 wherein said pulped ore is leached for a bout 1 hour.

18. The process according to claim 15 wherein said amount of sulphuric acid added to the heated pulped ore at atmospheric pressure is in an amount between about 80% and about 100% by w eight of the finely ground highly-serpentinized saprolite ore on a dry weight basis.

19. The process according to claim 15 wherein said water is sea water.

20. A process of leaching a highly-serpentinized saprolitic fraction of a nickel laterite ore profile and recovering metal values therefrom, comprising the steps of:
   a) preparing a finely ground highly-serpentinized saprolite ore;
   b) pulping sad finely ground highly-serpentinized saprolite ore with water to produce a pulped ore with a density of between about 15% and 33% solids;
   c) heating said pulped ore;
   d) adding sulphuric acid to the heated pulped ore at atmospheric pressure in an amount of at least about 80% by weight of the finely ground highly-serpentinized saprolite ore on a dry weight basis, wherein heat released by mixing said sulphuric acid with said pulped ore raises the temperature of the mixture to a reaction temperature of at least about 80° C.;
   e) agitating the mixture for an effective period of time, whereby metal oxides are leached from the heated pulped ore mixed with sulphuric acid to produce a hot leach pulp;
   f) adding a first basic neutralizing agent to said hot leach pulp to precipitate principally iron present in said hot leach pulp thereby producing a partially neutralized hot leach pulp;
   g) separating said partially neutralized hot leach pulp into liquid and solids, wherein said liquid contains sulphates of said metals; and
   h) recovering an intermediate product containing nickel and cobalt from said liquid.

21. The process according to claim 20 wherein said step g) of separating said partially neutralized hot leach pulp into liquid and solids and step h) of recovering an intermediate product containing nickel and cobalt from said liquid includes
   a) separating said partially neutralized hot leach pulp into liquid and solids to produce a clarified leach solution containing sulphates of said metals and a first leach tailings fraction; and
   b) recovering said intermediate product from said clarified leach solution.

22. The process according to claim 21 wherein said first basic neutralizing agent is limestone added to said hot leach pulp in an amount sufficient to give a pH in a range from about 3.5 to about 4.5.

23. The process according to claim 21 wherein said leaching takes place in leaching tanks, and wherein said sulphuric acid is introduced into said leaching tanks at a rate synchronized with a pulped ore feed rate into said leaching tanks, and wherein said pulped ore is heated prior to being pumped into said leaching tanks by means of indirect heat exchange with said partially neutralized hot leach pulp leaving said leaching tanks, and wherein said pulped ore is further heated directly in the leaching tanks to said reaction temperature of at least 80° C. by heat on released by mixing said pulped ore with said sulphuric acid.

24. The process according to claim 23 wherein said partially neutralized hot leach pulp leaving said leaching tanks is pumped through a heat exchanger having inner and outer chambers separated by heat conducting walls, and wherein said partially neutralized hot leach pulp is pumped through one chamber while said pulped ore is pumped through the other chamber of said heat exchanger thereby heating the pulped ore by transfer of heat from the partially neutralized hot leach pulp through the heat conducting walls.

25. The process according to claim 21 wherein said step of recovering an intermediate product from said clarified leach solution includes neutralization of said clarified leach solution by adding thereto a second basic neutralizing agent for producing said intermediate product.

26. The process according to claim 25 wherein said second basic neutralizing agent is a basic oxide selected from the group consisting of lime and magnesia so that said intermediate product is a nickel-cobalt hydroxide product.

27. The process according to claim 25 wherein said second basic neutralizing agent is soda ash so that said intermediate product is a nickel-cobalt hydroxide/carbonate product.

28. The process according to claim 21 wherein said step of recovering an intermediate product from said clarified leach solution includes addition of a sulphiding agent to produce an intermediate nickel-cobalt sulphide product.

29. The process according to claim 28 wherein said sulphiding agent is hydrogen sulphide or a sodium sulphide compound.

30. The process according to claim 24 including monitoring of pH of said mixture of pulped ore and sulphuric acid in said leaching tanks, including regulating sulphuric acid additions into said leaching tanks to give a pH of said mixture in a range from about 1.5 to 2.0 in the hot leach pulp upon completion of leaching.

31. The process according to claim 20 wherein said amount of sulphuric acid added to the heated pulped ore at atmospheric pressure is in an amount between about 80% and about 100% by weight of the finely ground highly-serpentinized saprolite ore on a dry weight basis.

32. The process according to claim 20 wherein said water is sea water.

33. The process according to claim 22 wherein said heat produced by mixing said sulphuric acid with said pulped ore raises the temperature of the mixture to a reaction temperature of at least about 85° C.

* * * * *